United States Patent [19]

Drewes et al.

[11] Patent Number: 5,519,077
[45] Date of Patent: May 21, 1996

[54] STABILIZED POLYVINYL CHLORIDE

[75] Inventors: Rolf Drewes, Lindenfels; Markus Kolb, Plankstadt; Karl J. Kuhn, Lautertal; Hans-Jürgen Sander, Lorsch; Wolfgang Wehner, Ober-Ramstadt, all of Germany

[73] Assignee: Ciba-Geigy Corporation, Tarrytown, N.Y.

[21] Appl. No.: 419,313

[22] Filed: Apr. 10, 1995

[30] Foreign Application Priority Data

Apr. 15, 1994 [CH] Switzerland .................. 1141/94

[51] Int. Cl.$^6$ ..................................... C08K 5/15
[52] U.S. Cl. .................. 524/114; 524/80; 524/109; 524/291; 524/399; 524/400; 524/450
[58] Field of Search ................. 524/400, 399, 524/80, 114, 291, 450, 109

[56] References Cited

U.S. PATENT DOCUMENTS

| | | | |
|---|---|---|---|
| 3,247,155 | 4/1966 | Frank et al. | 260/30.4 |
| 3,356,630 | 12/1967 | Vona et al. | 260/30.4 |
| 3,448,067 | 6/1969 | Penneck | 524/400 |
| 3,479,309 | 11/1969 | Hecker et al. | 524/400 |
| 3,499,866 | 3/1970 | Schwab | 260/45.8 |
| 5,350,785 | 9/1994 | Sander et al. | 524/400 |

FOREIGN PATENT DOCUMENTS

| | | |
|---|---|---|
| 3402408 | 7/1985 | Germany . |
| 61-34042 | 2/1986 | Japan . |
| 61-34041 | 2/1986 | Japan . |
| 3122149 | 5/1991 | Japan . |
| 4-136054 | 5/1992 | Japan . |
| 1496865 | 1/1978 | United Kingdom . |

OTHER PUBLICATIONS

CA 103:196904K (1985) of DE 3,402,408.

*Primary Examiner*—Veronica P. Hoke
*Attorney, Agent, or Firm*—Michele A. Kovaleski

[57] ABSTRACT

A high degree of stabilization of polyvinyl chloride is achieved by using a perchlorate, a terminal epoxide compound and an antioxidant.

12 Claims, No Drawings

STABILIZED POLYVINYL CHLORIDE

The invention relates to PVC (polyvinyl chloride) which has been stabilized by epoxide compounds, perchlorates and antioxidants, to a process for its preparation, and to its use.

PVC can be stabilized by a number of additives. Heavy-metal compounds of lead and cadmium are particularly suitable for this purpose, but are controversial today for ecological reasons due to the heavy-metal content (cf. "Plastics Additives", Editors R. Gächter and H. Müller, Hanser Verlag, 3rd Edition, 1990, pages 287–295, and "Kunststoff-Handbuch PVC" [Plastics Handbook PVC], Volumes 1 and 2, Beck/Braun, Carl Hanser Verlag).

The search therefore continues for effective stabilizers and stabilizer combinations.

Epoxide compounds have been known for some time as costabilizers for PVC. Epoxidized soybean oil is frequently used (cf., for example, "Plastics Additives", Editors R. Gächter and H. Müller, Hanser Verlag, 3rd Edition, 1990, pages 303–4, and U.S. Pat. No. 3,928,267). For chlorinated polyvinyl chloride, the use of glycidyl ethers of novolak resins as stabilizer has also been described, for example in DE 3,402,408.

JP Hei 3122149 proposes a rigid PVC composition which comprises a combination of solid epoxides and perchlorate for improving the stabilization that can be achieved by means of liquid epoxides and perchlorate.

It has now been found that PVC stabilized by means of a mixture of a perchlorate, a terminal epoxide and additionally an antioxidant has excellent thermal stability with a good initial colour and good colour retention. Surprisingly, the PVC stabilized in accordance with the invention meets the high demands made, for example, of PVC stabilized by means of barium/zinc compounds. Particular mention should be made of the excellent shelf life and light stability that are achieved. Furthermore, good stabilization is achieved irrespective of the state of aggregation of the epoxide, i.e. liquid terminal epoxides can also be employed without disadvantage.

The invention therefore relates to a composition comprising (a) PVC,
(b) perchloric acid or a perchlorate
(c) a terminal epoxide compound and
(d) an antioxidant.

The composition preferably contains no compounds of lead or cadmium.

Component (a) is taken to mean PVC in the broader sense, i.e. it also includes blends, copolymers or graft polymers of PVC with polymerizable compounds or (co)polymers, such as ABS, where suspension, bulk or emulsion polymers or blends thereof are possible. Preference is given to PVC as suspension, emulsion or bulk polymer or in combination with polyacrylates.

Component (a) in the novel compositions can thus also be, for example, compositions comprising (i) 20–80 parts by weight of a vinyl chloride homopolymer (PVC) and (ii) 80–20 parts by weight of at least one thermoplastic copolymer based on styrene and acrylonitrile, in particular from the group consisting of ABS, NBR, NAR, SAN and EVA. The abbreviations used for the copolymers are known to the person skilled in the art and have the following meanings: ABS=acrylonitrile-butadiene-styrene; SAN= styrene-acrylonitrile; NBR=acrylonitrile-butadiene; NAR=acrylonitrile-acrylate; EVA= ethylene-vinyl acetate. Also suitable are, in particular, acrylate-based styrene-acrylonitrile copolymers (ASA). In the broader sense, component (a) is preferably a polymer composition comprising, as components (i) and (ii), a mixture of 25–75% by weight of PVC and 75–25% by weight of said copolymers. Examples of such compositions are: 25–50% by weight of PVC and 75–50% by weight of copolymers or 40–75% by weight of PVC and 60–25% by weight of copolymers. Preferred copolymers are ABS, SAN and modified EVA, in particular ABS. NBR, NAR and EVA are also particularly suitable. The novel composition can comprise one or more of said copolymers. Of particular importance as component (a) in the broader sense are compositions comprising (i) 100 parts by weight of PVC and (ii) 0–300 parts by weight of ABS and/or SAN-modified ABS and 0–80 parts by weight of the copolymers NBR, NAR and/or EVA, but in particular EVA, and, per 100 parts by weight of (i) and (ii), 0–120 parts by weight of plasticizers, in particular phthalates, especially DOP, DINP and DIDP, and/or trimellitates, especially TOTM, TIDTM and TITDTM [cf. below under Plasticizers, A) and C)].

An expedient composition is as described above wherein component (b) is at least one perchlorate of the formula $M(ClO_4)_n$ where $M^+$ is $H^+$, $NH_{4=hu +}$, $Na^+$, $K^+$, $Mg^{2+}$, $Ca^{2+}$, $Ba^{2+}$ or $Al^{3+}$. The index n is 1, 2 or 3, corresponding to the valency of M.

Perchloric acid or the particular perchlorate can be employed in various customary forms, for example as a salt or an aqueous solution coated onto a support material, such as PVC, calcium silicate, zeolites or hydrotalcites, or bonded into a hydrotalcite by chemical reaction.

The perchlorates can be used in an amount of, for example, from 0.001 to 5 parts by weight, preferably from 0.01 to 3 parts by weight, particularly preferably from 0.01 to 2 parts by weight, based on 100 parts by weight of PVC.

Epoxide compounds

The terminal epoxide compounds (c) which can be used for the purposes of the invention can have an aliphatic, aromatic, cycloaliphatic, araliphatic or heterocyclic structure; they contain epoxide groups as side groups. The epoxide groups are preferably bonded to the remainder of the molecule as glycidyl groups via ether or ester bonds, or they are N-glycidyl derivatives of heterocyclic amines, amides or imides. Epoxide compounds of these types are known in general terms and are commercially available.

The epoxide compounds contain at least one epoxide radical of the formula I

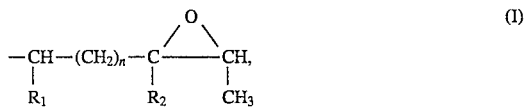

where $R_1$ and $R_3$ are both hydrogen, $R_2$ is hydrogen or methyl, and n is 0, or in which $R_1$ and $R_3$ together are $-CH_2-CH_2-$ or $-CH_2-CH_2-CH_2-$, $R_2$ is then hydrogen, and n is 0 or 1 and this epoxide radical is bonded directly to carbon, oxygen, nitrogen or sulfur atoms.

Examples which may be mentioned of epoxide compounds are:

I) Glycidyl and β-methylglycidyl esters obtainable by reacting a compound containing at least one carboxyl group in the molecule and epichlorohydrin or glycerol dichlorohydrin or β-methylepichlorohydrin. The reaction is preferably carried out in the presence of bases.

The compounds containing at least one carboxyl group in the molecule can be aliphatic carboxylic acids. Examples of these carboxylic acids are glutaric acid, adipic acid, pimelic acid, suberic acid, azelaic acid, sebacic acid or dimerized or trimerized linoleic acid, acrylic acid, methacrylic acid, caproic acid, caprylic acid, lauric acid, myristic acid, palmitic acid, stearic acid and pelargonic acid, and the acids mentioned in the case of the organic zinc compounds.

However, it is also possible to employ cycloaliphatic carboxylic acids, for example cyclohexanecarboxylic acid, tetrahydrophthalic acid, 4-methyltetrahydrophthalic acid, hexahydrophthalic acid or 4-methylhexahydrophthalic acid.

It is also possible to use aromatic carboxylic acids, for example benzoic acid, phthalic acid, isophthalic acid, trimellitic acid or pyromellitic acid.

It is likewise possible to use carboxyl-terminated adducts, for example of trimellitic acid and polyols, for example glycerol or 2,2-bis(4-hydroxycyclohexyl)propane.

Other epoxide compounds which can be used for the purposes of the present invention are given in EP 0 506 617.

II) Glycidyl or β-methylglycidyl ethers obtainable by reacting a compound containing at least one free alcoholic hydroxyl group and/or phenolic hydroxyl group and a suitably substituted epichlorohydrin under alkaline conditions, or in the presence of an acid catalyst followed by alkali treatment.

Ethers of this type are derived, for example, from acyclic alcohols, such as ethylene glycol, diethylene glycol and higher poly(oxyethylene)glycols, propane-1,2-diol or poly-(oxypropylene)glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins, butanol, amyl alcohol, pentanol and from monofunctional alcohols such as isooctanol, 2-ethylhexanol, isodecanol and $C_7$–$C_9$alkanol and $C_9$–$C_{11}$ alkanol mixtures.

However, they are also derived, for example, from cycloaliphatic alcohols, such as 1, 3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they contain aromatic rings, such as N,N-bis(2-hydroxyethyl)aniline or p,p'-bis(2-hydroxyethylamino)diphenylmethane.

The epoxide compounds can also be derived from monocyclic phenols, for example from phenol, resorcinol or hydroquinone; or they are based on polycyclic phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone or on condensation products of phenols with formaldehyde obtained under acid conditions, such as phenol novolaks.

Examples of other possible terminal epoxides are: glycidyl 1-naphthyl ether, glycidyl 2-phenylphenyl ether, 2-biphenyl glycidyl ether, N-(2,3-epoxypropyl)phthalimide and 2,3-epoxypropyl 4-methoxyphenyl ether.

III) N-Glycidyl compounds obtainable by dehydrochlorinating the products of the reaction of epichlorohydrin with amines, which contain at least one amino hydrogen atom. These amines are, for example, aniline, N-methylaniline, toluidine, n-butylamine, bis(4-aminophenyl)methane, m-xylylenediamine or bis(4-methylaminophenyl)methane, but also N,N,O-triglycidyl-m-aminophenol or N,N,O-triglycidyl-p-aminophenol.

However, the N-glycidyl compounds also include N,N'-di-, N,N', N''-tri- and N,N',N'',N'''-tetraglycidyl derivatives of cycloalkyleneureas, such as ethyleneurea or 1,3-propyleneurea, and N,N'-diglycidyl derivatives of hydantoins, such as of 5,5-dimethylhydantoin or glycol uril and triglycidyl isocyanurate.

IV) S-Glycidyl compounds, for example di-S-glycidyl derivatives derived from dithiols, for example ethane-1,2-dithiol or bis(4-mercaptomethylphenyl)ether.

V) Epoxide compounds containing a radical of the formula I in which $R_1$ and $R_3$ together are —$CH_2$—$CH_2$—, and n is 0, are bis(2,3-epoxycyclopentyl)ether, 2,3-epoxycyclopentyl glycidyl ether or 1,2-bis(2,3-epoxycyclopentoxy)ethane. An example of an epoxy resin containing a radical of the formula I in which $R_1$ and $R_3$ together are —$CH_2$—$CH_2$— and n is 1 is 3'4'-epoxy-6'-methylcyclohexyl)methyl 3,4-epoxy-6-methylcyclohexanecarboxylate.

Examples of suitable terminal epoxides are:

a) liquid bisphenol A diglycidyl ethers, such as Araldit®GY 240, Araldit®GY 250, Araldit®GY 260, Araldit®GY 266, Araldit®GY 2600, Araldit®MY 790;

b) solid bisphenol A diglycidyl ethers, such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610;

c) liquid bisphenol F diglycidyl ethers, such as Araldit®GY 281, Araldit®PY 302, Araldit®PY 306;

d) solid polyglycidyl ethers of tetraphenylethane, such as CG Epoxy Resin®0163;

e) solid and liquid polyglycidyl ethers of phenol-formaldehyde novolak, such as EPN 1138, EPN 1139, GY 1180, PY 307;

f) solid and liquid polyglycidyl ethers of o-cresol-formaldehyde novolak, such as ECN 1235, ECN 1273, ECN 1280, ECN 1299;

g) liquid glycidyl ethers of alcohols, such as Shell®glycidyl ether 162, Araldit®DY 0390, Araldit®DY 0391;

h) liquid glycidyl ethers of carboxylic acids, such as Shell®Cardura E terephthalates, trimellitates, Araldit®PY 284;

i) solid heterocyclic epoxy resins (triglycidyl isocyanurates), such as Araldit®PT 810;

j) liquid cycloaliphatic epoxy resins, such as Araldit®CY 179;

k) liquid N,N,O-triglycidyl ether of p-aminophenol, such as Araldit®MY 0510;

l) tetraglycidyl-4,4'-methylenebenzamine or N,N,N',N'-tetraglycidyldiaminophenylmethane, such as Araldit®MY 720, Araldit®MY 721.

Preference is given to epoxide compounds containing two functional groups. However, it is in principle possible for epoxide compounds containing one, three or more functional groups to be used.

Predominantly employed are epoxide compounds, in particular diglycidyl compounds, having aromatic groups.

If desired, a mixture of different epoxide compounds can also be employed.

Particularly preferred terminal epoxide compounds are diglycidyl ethers based on bisphenols, for example on 2,2-bis(4-hydroxyphenyl)propane (bisphenol A), bis(4-hydroxyphenyl)methane or mixtures of bis(ortho/para-hydroxyphenyl)methane (bisphenol F).

The terminal epoxide compounds can be employed in an amount of preferably at least 0.1 part by weight, for example from 0.1 to 50 parts by weight, preferably from 1 to 30 parts by weight, in particular from 1 to 25 parts by weight, based on 100 parts by weight of PVC.

Antioxidants:

Preferred antioxidants (d) contain phenolic groups. These preferably conform to the formula II

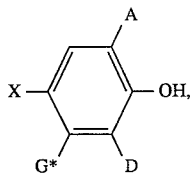
(II)

in which

A is hydrogen, $C_1$–$C_{24}$alkyl, $C_5$–$C_{12}$cycloalkyl, phenyl-$C_1$–$C_4$alkyl, phenyl or —$CH_2$—S—$R'_1$ or

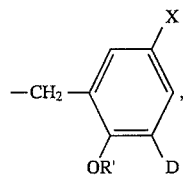

D is $C_1$–$C_{24}$alkyl, $C_5$–$C_{12}$cycloalkyl, phenyl-$C_1$–$C_4$alkyl, phenyl or —$CH_2$—S—$R''_1$, X is hydrogen, $C_1$–$C_{18}$alkyl, —$C_aH_{2a}$—$S_q$—$R'_2$, —$C_bH_{2b}$—CO—$OR'_3$, —$C_bH_{2b}$—CO—N($R'_5$)($R'_6$), —$CH_2$N($R'_{10}$)($R'_{11}$),

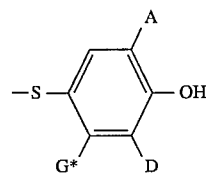

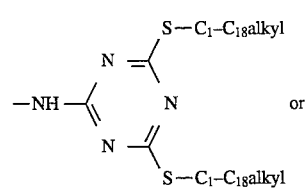

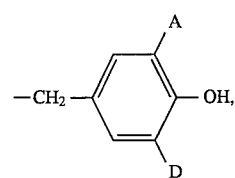

R' is hydrogen or —CO—CH=$CH_2$,

G* is hydrogen or $C_1$–$C_{12}$alkyl, $R'_1$ is $C_{18}$alkyl, phenyl, —$(CH_2)_c$—CO—$OR'_4$ or —$CH_2CH_2OR'_9$, $R'_2$ is hydrogen, $C_1$–$C_{18}$alkyl, phenyl, benzyl,

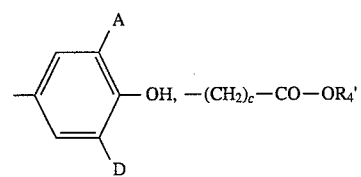

or —$CH_2$—$CH_2$—$OR'_9$, $R'_3$ is $C_1$–$C_{30}$alkyl, —$CHR'_7$—$CH_2$—S—$R'_8$,

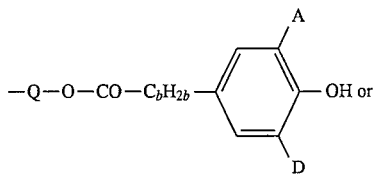

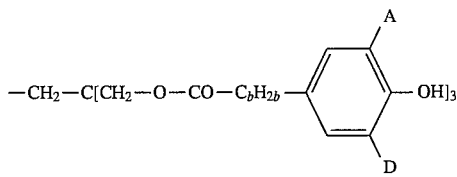

in which Q is $C_2$–$C_8$alkylene, $C_4$–$C_6$thiaalkylene or —$CH_2CH_2(OCH_2CH_{2d}$—, $R'_4$ is $C_1$–$C_{24}$alkyl, $R'_5$ is hydrogen, $C_1$–$C_{18}$alkyl or cyclohexyl, $R'_6$ is $C_1$–$C_{18}$alkyl, cyclohexyl, phenyl, $C_1$–$C_{18}$alkyl-substituted phenyl,

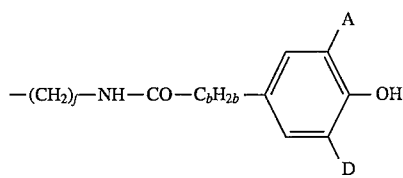

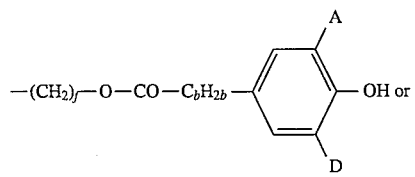

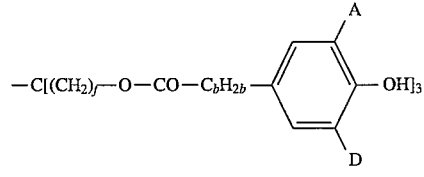

or $R'_5$ and $R'_6$ together are $C_4$–$C_8$alkylene, which may be interrupted by —O— or —NH—, $R'_7$ is hydrogen, $C_1$–$C_4$alkyl or phenyl, $R'_8$ is $C_1$–$C_{18}$alkyl, $R'_9$ is hydrogen, $C_1$–$C_{24}$alkyl, phenyl, $C_2$–$C_8$alkanoyl or benzoyl, $R'_{10}$ is $C_1$–$C_{18}$alkyl, cyclohexyl, phenyl, $C_1$–$C_{18}$alkyl-substituted phenyl or

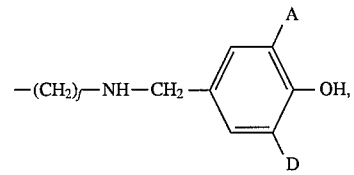

$R'_{11}$ is hydrogen, $C_1$–$C_{18}$alkyl, cyclohexyl or

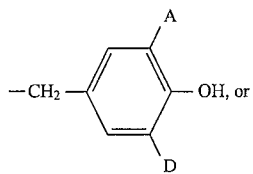

$R'_{10}$ and $R'_{11}$ together are $C_4$–$C_8$alkylene, which may be interrupted by —O— or —NH—, a is 0, 1, 2 or 3, b is 0, 1, 2 or 3, c is 1 or 2, d is 1 to 5, f is 2 to 8 and q is 1, 2, 3 or 4.

Preference is given to a phenolic compound of the formula II in which

A is hydrogen, $C_1$–$C_8$alkyl, cyclohexyl, phenyl, —$CH_2$—S—$C_1$–$C_{18}$alkyl or

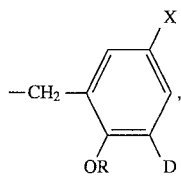

D is $C_1$–$C_8$alkyl, cyclohexyl, phenyl or —$CH_2$—S—$C_1$–$C_{18}$alkyl,

X is hydrogen, $C_1$–$C_8$alkyl, —$C_aH_{2a}$—$S_q$—$R'_2$, —$C_bH_{2b}$—CO—$OR'_3$, —$CH_2N(R'_{10})(R'_{11})$,

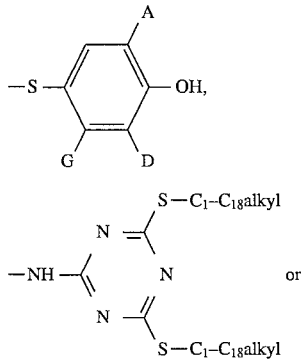

$R'_2$ is $C_1$–$C_{12}$alkyl, phenyl or —$(CH_2)_c$—CO—$OR'_4$,
$R'_3$ is $C_1$–$C_{18}$alkyl or

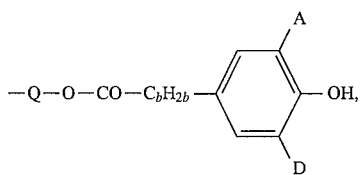

in which Q is $C_2$–$C_8$alkylene, —$CH_2$—$CH_2$—S—$CH_2CH_2$ or —$CH_2CH_2(OCH_2CH_2)_d$—,
$R'_4$ is $C_1$–$C_{18}$alkyl, $R'_{10}$ and $R'_{11}$, independently of one another, are hydrogen or $C_1$–$C_{12}$alkyl or $R'_{10}$ and $R'_{11}$ together are $C_4$–$C_8$alkylene, which may be interrupted by —O— or —NH—, a is 1 or 2, b is 1 or 2, c is 1 or 2 and d is 1, 2 or 3.

Particular preference is given to compounds containing at least one group of the formula

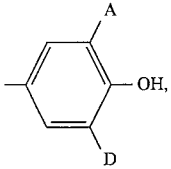

in which A is hydrogen, methyl or tert-butyl, and D is unsubstituted or substituted alkyl or unsubstituted or substituted alkylthioalkyl.

Examples of suitable antioxidants are:

1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, octylphenol, nonylphenol and mixtures thereof.

2. Alkylthiomethylphenols, for example 2,4-dioctylthiomethyl-6-tert-butylphenol, 2,4-dioctylthiomethyl-6-methylphenol, 2,4dioctylthiomethyl-6-ethylphenol, 2,6-didodecylthiomethyl-4-nonylphenol.

3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

4. Hydroxylated diphenyl thioethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

5. Alkylidenebisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'hydroxy-5'-methylbenzyl)-6-tert-butyl-4-methyl-phenyl] terephthalate, 1,1-bis(3,5-dimethyl-2-hydroxyphenyl)butane, 2,2-bis(3,5-di-tert-butyl-4-hydroxyphenyl)propane, 2,2-bis(4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

6. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl 3,5-di-tert-butyl-4-hydroxybenzylmercaptoacetate.

7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl)phenyl]2,2-bis(3,5-di-tert-butyl-4-hydroxybenzyl)malonate.

8. Hydroxybenzyl aromatic compounds, for example 1,3,5-tris(3,5-di-tert-butyl-4-hydroxybenzyl)- 2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

9. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5triazine, 2,4,6-tris (3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

10. Phosphonates, phosphites and phosphonites, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of monoethyl 3,5-di-tert-butyl-4-hydroxybenzyl phosphonate, triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, bisisodecyloxy pentaerythritol diphosphite, bis(2,4-di-tert-butyl-6-methylphenyl)pentaerythrityl diphosphite, bis(2,4,6-tri-tert-butylphenyl)pentaerythrityl diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyldibenz[d,g]-1,3,2-dioxaphosphocine, bis(2,4-di-tert-butyl-6-methylphenyl) methyl phosphite, bis(2,4-di-tert-butyl-6-methylphenyl)ethyl phosphite $(C_9H_{19}-C_6H_4-O)_{1.5}-P-(O-C_{12-13}H_{25-27})_{1.5}$.

11. Acylaminophenols, for example 4-hydroxylauranilide, 4-hydroxystearanilide, octyl N-(3,5-di-tert-butyl-4-hydroxyphenyl)carbamate.

12. Esters of β-(3,5-di-tert-butyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, dipentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, ditrimethyolpropane, 4-hydroxymethyl-1-phospha-2,6,7-trioxabicyclo-[2.2.2]-octane.

13. Esters of β-(5-tert-butyl-4-hydroxy-3-methylphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

14. Esters of β-(3,5-dicyclohexyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

15. Esters of 3,5-di-tert-butyl-4-hydroxyphenylacetic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

16. Amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Of these, preference is given to antioxidants from groups 1–5, 10 and 12, in particular 2,2-bis(4-hydroxyphenyl)propane and the esters of 3,5-di-tert-butyl-4-hydroxyphenylpropionic acid with octadecanol or pentaerythritol, or tris(2,4-di-tert-butylphenyl)phosphite.

If desired, a mixture of different antioxidants can also be employed.

The antioxidants can be used in an amount of, for example, 0.01 to 10 parts by weight, preferably from 0.1 to 10 parts by weight, in particular from 0.1 to 5 parts by weight, based on 100 parts by weight of PVC.

The PVC stabilized according to the invention may contain further additives. These are, for example, plasticizers, metal soaps, fillers and reinforcing materials (for example calcium carbonate, silicates, glass fibres, talc, kaolin, chalk, mica, metal oxides and hydroxides, carbon black or graphite), polyols, zeolites, dawsonites, hydrotalcites, organic phosphites, 1,3-diketo compounds, dihydropyridines, α-phenylindole, pyrroles, β-naphthol, hydroxydiphenylamines, sterically hindered amines (HALS), light stabilizers, UV absorbers, lubricants, fatty acid esters, paraffins, blowing agents, optical brighteners, pigments, flameproofing agents, antistatics, β-aminocrotonates (for example as mentioned in EP 0 465 405, p. 6, lines 9–14), phosphates, thiophosphates, gelling aids, peroxide-scavengers, modifiers and further complexing agents for Lewis acids.

Fillers

The fillers used are, for example, chalk, kaolin, china clay, talc, silicates, glass fibres, glass beads, sawdust, mica, metal oxides, metal hydroxides, carbon black, graphite, rock flour and barytes. Preference is given to chalk and talc.

The fillers can be employed in an amount of, preferably, at least 1 part by weight, for example from 5 to 200 parts by weight, preferably from 10 to 150 parts by weight, in particular from 15 to 100 parts by weight, based on 100 parts by weight of PVC.

Examples of suitable organic plasticizers are those from the following groups:

A) Phthalates (esters of phthalic acid)

Examples of these plasticizers are dimethyl, diethyl, dibutyl, dihexyl, di-2-ethylhexyl, di-n-octyl, di-isooctyl, di-isononyl, di-isodecyl, di-isotridecyl, dicyclohexyl, dimethylcyclohexyl, dimethyl glycol, dibutyl glycol, benzyl butyl and diphenyl phthalates, and mixtures of phthalates, such as $C_7$–$C_9$— and $C_9$–$C_{11}$alkyl phthalates made from predominantly linear alcohols, $C_6$–$C_{10}$-n-alkyl phthalates and $C_8$–$C_{10}$-n-alkyl phthalates. Preference is given to dibutyl, dihexyl, di-2-ethylhexyl, di-n-octyl, di-isooctyl, di-isononyl, di-isodecyl, di-isotridecyl and benzyl butyl phthalates, and said mixtures of alkyl phthalates. Particular preference is given to di-2-ethylhexyl, di-isononyl and di-isodecyl phthalate. Customary abbreviations are DOP (dioctyl phthalate, di-2-ethylhexyl phthalate), DINP (diisononyl phthalate) and DIDP (diisodecyl phthalate) are customary.

B) Esters of aliphatic dicarboxylic acids, in particular esters of adipic, azelaic and sebacic acids Examples of these plasticizers are di-2-ethylhexyl adipate, di-isooctyl adipate (mixture), di-isononyl adipate (mixture), di-isodecyl adipate (mixture), benzyl butyl adipate, benzyl octyl adipate, di-2-ethylhexyl azelate, di-2-ethylhexyl sebacate and di-isodecyl sebacate (mixture). Preference is given to di-2-ethylhexyl adipate and di-isooctyl adipate.

C) Esters of trimellitic acid, for example tri-2-ethylhexyl trimellitate, tri-isodecyl trimellitate (mixture), tri-isotridecyl trimellitate, tri-isooctyl trimellitate (mixture) and tri-$C_6$–$C_8$alkyl, tri-$C_6$–$C_{10}$alkyl, tri-$C_7$–$C_9$alkyl and tri-$C_9$–$C_{11}$alkyl trimellitates. The last-mentioned trimellitates are formed by esterifying trimellitic acid by means of the appropriate alkanol mixtures. Preferred trimellitates are tri-2-ethylhexyl trimellitate and said trimellitates made from alkanol mixtures. Customary abbreviations are TOTM (trioctyl trimellitate, tri-2-ethylhexyl trimellitate), TIDTM (triisodecyl trimellitate) and TITDTM (triisotridecyl trimellitate).

D) Epoxide plasticizers

These are principally epoxidized unsaturated fatty acids, for example epoxidized soybean oil.

E) Polymer plasticizers

A definition of these plasticizers and examples thereof are given in the handbook "Plastics Additives", edited by R. G ächter and H. Müller, Hanser Verlag, 1985, page 393, chapter 5.9.6, and in "PVC Technology", edited by W. V. Titow, 4th Ed., Elsevier Publ., 1984, pages 165–170. The most usual starting materials for the preparation of polyester plasticizers are: dicarboxylic acids, such as adipic, phthalic, azelaic and sebacic acids; diols, such as 1,2-propanediol, 1,3-butanediol, 1,4-butanediol, 1,6-hexanediol, neopentyl glycol and diethylene glycol; monocarboxylic acids, such as acetic, caproic, caprylic, lauric, myristic, palmitic, stearic, pelargonic and benzoic acids; monofunctional alcohols, such as isooctanol, 2-ethylhexanol, isodecanol and $C_7$–$C_9$alkanol and $C_9$–$C_{11}$alkanol mixtures. Particularly advantageous are polyester plasticizers made from said dicarboxylic acids and monofunctional alcohols.

F) Esters of phosphoric acid

A definition of these esters is given in the abovementioned "Plastics Additives Handbook" on page 271, chapter 5.7.2. Examples of these phosphates are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate and ®Reofos 50 and 95.

G) Chlorinated hydrocarbons (paraffins)

H) Hydrocarbons

I) Monoesters, for example butyl oleate, phenoxyethyl oleate, tetrahydrofurfuryl oleate and esters of alkylsulfonic acids.

J) Glycol esters, for example diglycol benzoates.

Definitions and examples of plasticizers from groups G) to J) are given in the following handbooks:

"Plastics Additives", edited by R. Gächter and H. Müller, Hanser Publishers, 1985, chapter 5.9.14.2 (Group G)) and chapter 5.9.14.1 (Group H)).

"PVC Technology", edited by W. V. Titow, 4th Ed., Elsevier Publishers, 1984, pages 171–173, chapter 6.10.2 (Group G)), page 174, chapter 6.10.5 (group H)), page 173, chapter 6.10.3 (group I)) and pages 173–174, chapter 6.10.4 (group J)).

Particular preference is given to plasticizers from groups A) to G), in particular A) to F), especially the plasticizers in these groups which have been mentioned as preferred.

In general, from 5 to 120 parts, in particular from 10 to 100 parts, of the plasticizers from groups A), B), C) and E), from 0.5 to 30 parts, in particular from 0.5 to 20 parts, of those from group D) and from 1 to 100 parts, in particular from 2 to 80 parts, of those from groups F) and G) are present.

It is also possible to use mixtures of different plasticizers.

The plasticizers can be used in an amount of, for example, from 5 to 120 parts by weight, preferably from 10 to 100 parts by weight, in particular from 20 to 70 parts by weight, based on 100 parts by weight of PVC.

Metal soaps

Metal soaps are principally metal carboxylates, preferably of long-chain carboxylic acids. Customary examples are stearates and laurates, but also oleates and salts of relatively short-chain alkylcarboxylic acids. Metal soaps also include alkylbenzoic acids. Use is frequently made of synergistic mixtures, such as barium/zinc, magnesium/zinc or calcium/zinc stabilizers. Metal soaps can be employed individually or as mixtures. A review of customary metal soaps is given in Ullmann's Encyclopedia of Industrial Chemistry, 5th Ed., Vol. A16(1985), pp. 361 ff.).

Preference is given to organic metal soaps from the series consisting of aliphatic saturated $C_2$–$C_{22}$carboxylates, aliphatic unsaturated $C_3$–$C_{22}$carboxylates, aliphatic $C_2$–$C_{22}$carboxylates which are substituted by at least one OH group, cyclic and bicyclic carboxylates having 5–22 carbon atoms, unsubstituted, at least mono-OH-substituted and/or $C_1$–$C_{16}$alkyl-substituted phenylcarboxylates, unsubstituted, at least mono-OH-substituted and/or $C_1$–$C_6$alkyl-substituted naphthylcarboxylates, phenyl $C_1$–$C_6$alkylcarboxylates, naphthyl-$C_1$–$C_{16}$alkylcarboxylates or unsubstituted or $C_1$–$C_{12}$alkyl-substituted phenolates, tallates and rosinates.

Specific mention may be made by way of example of zinc, calcium, magnesium or barium salts of monovalent carboxylic acids, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, isostearic acid, stearic acid, 12-hydroxystearic acid, behenic acid, benzoic acid, p-tert-butylbenzoic acid, dimethylhydroxybenzoic acid, 3,5-di-tert-butyl-4-hydroxybenzoic acid, tolic acid, dimethylbenzoic acid, ethylbenzoic acid, n-propylbenzoic acid, salicylic acid, p-tert-octylsalicylic acid and sorbic acid; calcium, magnesium and zinc salts of monoesters of divalent carboxylic acids, such as oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, phthalic acid, isophthalic acid, terephthalic acid and hydroxyphthalic acid; and di-or triesters of tri-or tetravalent carboxylic acids, such as hemimellitic acid, trimellitic acid, pyromellitic acid and citric acid.

Preference is given to calcium, magnesium and zinc carboxylates of carboxylic acids having 7 to 18 carbon atoms (metal soaps in the stricter sense), for example benzoates or alkanoates, preferably stearates, oleates, laurates, palmitates, behenates, hydroxystearates, dihydroxystearates or 2-ethylhexanoates. Particular preference is given to stearates, oleates and p-tert-butylbenzoates. Superbasic carboxylates, such as superbasic zinc octanoate, are also preferred.

It is also possible to use a mixture of carboxylates having different structures. Preference is given to compositions as described above comprising an organic zinc and/or calcium compound.

In addition to said compounds, organic aluminium compounds are also suitable, in particular compounds analogous to those mentioned above. Further details of the preferred aluminium compounds which can be used are given in U.S. Pat. No. 4,060,512, and U.S. Pat. No. 3,243,394.

Suitable compounds, in addition to those mentioned above, are also organic rare-earth compounds, in particular compounds analogous to those mentioned above. The term rare-earth compound is taken to mean, in particular, compounds of the elements cerium, praseodymium, neodymium, samarium, europium, gadolinium, terbium, dysprosium, holmium, erbium, thulium, ytterbium, lutetium, lanthanum and yttrium, mixtures, in particular with cerium, being preferred. Further preferred rare-earth compounds are given in EP-A-0 108 023.

It is also possible to employ a mixture of zinc compounds, alkaline earth metal compounds, aluminium compounds, lanthanum compounds and lanthanoid compounds having different structures. Organic zinc, aluminium, lanthanum or lanthanoid compounds can also be coated onto an alumo salt compound; cf. also DE-A-4 031 818.

The metal soaps or mixtures thereof can be used in an amount of, for example, from 0.001 to 10 parts by weight, preferably from 0.01 to 8 parts by weight, particularly preferably from 0.05 to 5 parts by weight, based on 100 parts by weight of PVC. The same applies to the other metal stabilizers:

Other metal stabilizers

Specific mention may be made of organotin stabilizers. These are, in particular, carboxylates, mercaptides and sulfides. Suitable compounds are described in U.S. Pat. No. 4,743,640, (columns 3–5).

β-Diketones 1,3-Dicarbonyl compounds which can be used can be linear or cyclic dicarbonyl compounds. Preference is given to dicarbonyl compounds of the formula

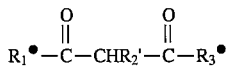

in which $R^*_1$ is $C_1$–$C_{22}$alkyl, $C_5$–$C_{10}$hydroxyalkyl, $C_2$–$C_{18}$alkenyl, phenyl, phenyl which is substituted by OH, $C_1$–$C_4$alkyl, $C_1$–$C_4$alkoxy or halogen, $C_7$–$C_{10}$phenylalkyl, $C_5$–$C_2$cycloalkyl, $C_5$–$C_2$cycloalkyl which is substituted by $C_1$–$C_4$alkyl, or an —$R^*_5$—S—$R^*_6$ or —$R^*_5$—O—$R_{*6}$ group, $R^*_2$ is hydrogen, $C_1$–$C_8$alkyl, $C_2$–$C_2$alkenyl, phenyl, $C_7$–$C_{12}$alkylphenyl, $C_7$–$C_{10}$phenylalkyl or a —CO—$R^*_4$ group, $R^*_3$ has one of the meanings given for $R^*_1$ or is $C_1$–$C_{18}$alkoxy, $R^*_4$ is $C_1$–$C_4$alkyl or phenyl, $R^*_5$ is $C_1$–$C_{10}$alkylene, and $R^*_6$ is $C_1$–$C_{12}$alkyl, phenyl, $C_7$–$C_{18}$alkylphenyl or $C_7$–$C_{10}$phenylalkyl.

These include the hydroxyl-containing diketones of EP-A-346 279 and the oxa- and thiadiketones of EP-A-307 358, and the isocyanuric acid-based diketones of U.S. Pat. No. 4,339,383.

Alkyl $R^*_1$ and $R^*_3$ can be, in particular $C_1$–$C_{18}$alkyl, for example methyl, ethyl, n-propyl, isopropyl, n-butyl, tert-butyl, pentyl, hexyl, heptyl, octyl, decyl, dodecyl or octadecyl.

Hydroxyalkyl $R^*_1$ and $R^*_3$ are, in particular, a —$(CH_2)_n$—OH group, in which n is 5, 6 or 7.

Alkenyl $R^*_1$ and $R^*_3$ can be, for example, vinyl, allyl, methallyl, 1-butenyl, 1-hexenyl or oleyl, preferably allyl.

OH—, alkyl-, alkoxy-or halogen-substituted phenyl $R^*_1$ and $R^*_3$ can be, for example, tolyl, xylyl, tert-butylphenyl, methoxyphenyl, ethoxyphenyl, hydroxyphenyl, chlorophenyl or dichlorophenyl.

Phenylalkyl $R^*_1$ and $R_{*3}$ are, in particular, benzyl. Cycloalkyl or alkylcycloalkyl $R^*_2$ and $R^*_3$ are, in particular, cyclohexyl or methylcyclohexyl.

Alkyl $R^*_2$ can be, in particular, $C_1$–$C_4$alkyl. $C_2$–$C_4$alkenyl $R^*_2$ can be, in particular, allyl. Alkylphenyl $R^*_2$ can be, in particular, tolyl. Phenylalkyl $R^*_2$ can be, in particular, benzyl. $R^*_2$ is preferably hydrogen. Alkoxy $R^*_3$ can be, for example, methoxy, ethoxy, butoxy, hexyloxy, octyloxy, dodecyloxy, tridecyloxy, tetradecyloxy or octadecyloxy. $C_1$–$C_{10}$alkylene $R^*_5$ is, in particular, $C_2$–$C_4$alkylene. Alkyl $R^*_6$ is, in particular, $C_4$–$C_{12}$alkyl, for example butyl, hexyl, octyl, decyl or dodecyl. Alkylphenyl $R^*_6$ is, in particular, tolyl. Phenylalkyl $R^*_6$ is, in particular, benzyl.

Examples of 1,3-dicarbonyl compounds of the above formula are acetylacetone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, stearoylbenzoylmethane, isooctylbenzoylmethane, 5-hydroxycaproylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl)methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, bis(cyclohexanoyl)methane, di(pivaloyl) methane, methyl, ethyl, hexyl, octyl, dodecyl or octadecyl acetoacetate, ethyl, butyl, 2-ethylhexyl, dodecyl or octadecyl benzoylacetate, ethyl, propyl, butyl, hexyl or octyl stearoyl acetate and dehydracetic acid, and the zinc or magnesium salts thereof.

Preference is given to 1,3-diketo compounds of the above formula in which $R^*_1$ is $C_1$–$C_{18}$alkyl, phenyl, phenyl which is substituted by OH, methyl or methoxy, $C_7$–$C_1$phenylalkyl or cyclohexyl, $R^*_2$ is hydrogen, and $R^\Omega_3$ has one of the meanings given for $R^*_1$.

The 1,3-diketo compounds can be used in an amount of, for example, from 0.01 to 10 parts by weight, preferably from 0.01 to 3 parts by weight, in particular from 0.01 to 2 parts by weight, based on 100 parts of weight of PVC.

Examples of suitable UV absorbers and light stabilizers are:

1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-yl phenol]; transesterification product of 2-[3'-tert-butyl-5'-(2-methoxycarbonylethyl)-2'-hydroxyphenyl]benzotriazole with polyethylene glycol 300; [R—CH$_2$CH$_2$—COO(CH$_2$)$_3$—]$_2$ where R=3'-tert-butyl-4'-hydroxy-5'-2H-benzotriazol-2-ylphenyl.

2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

6. Sterically hindered amines, for example bis(2,2,6,6-tetramethylpiperidyl)sebacate, bis(2,2,6,6-tetramethylpiperidyl)succinate, bis(1,2,2,6,6-pentamethylpiperidyl)sebacate, bis(1,2,2,6,6-pentamethylpiperidyl)n-butyl-3,5-di-tert-butyl-4-hydroxybenzylmalonate, the product of the condensation of 1-hydroxyethyl-2,2,6,6-tetramethyl-4-hydroxypiperidine and succinic acid, the product of the condensation of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl)1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl) succinate, the product of the condensation of N,N'-bis(2,2,6,6-tetramethyl-4-piperidyl)hexamethylene diamine and 4-morpholino-2,6-dichloro-1,3,5-triazine, the product of the condensation of 2-chloro-4,6-di(4-n-butylamino-2,2,6,6-tetramethylpiperidyl)1,3,5-triazine and 1,2-bis(3-aminopropylamino)ethane, the product of the condensation of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetra-methyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione.

7. Oxalamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6- bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butoxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis( 2,4-dimethylphenyl)-1,3,5-triazine.

Examples of suitable peroxide scavengers are: esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythrityl tetrakis(β-dodecylmercapto)propionate and ethylene glycol bismercaptoacetate.

Examples of suitable lubricants are: montan wax, fatty acid esters, PE waxes, amide waxes, chlorinated paraffins, glycerol esters and alkaline earth metal soaps. Lubricants which can be used are also described in "Plastics Additives", edited by R. Gächter and H. Müller, Hanser Verlag, 3rd Edition, 1990, pages 466–470. If calcium soaps are used, they can be employed in the usual amounts for lubricants, preferably less than 0.3 part, particularly preferably less than 0.2 part, per 100 parts of PVC. Preference is given to stabilized PVC containing no calcium soaps.

Examples of other metal-free stabilizers which can be used are β-naphthol, hydroxydiphenylamine, β-aminocrotonates, for example as mentioned in EP 0 465 405, p. 6, lines 9–14, pyrroles, as described, for example, in EP-A-465 405, and hydroxydiphenylamines.

Examples of suitable polyols are: pentaerythritol, dipentaerythritol, tripentaerythritol, bistrimethylolpropane, bistrimethylolethane, trismethylolpropane, sorbitol, maltitol, isomaltitol, lactitol, lycasin, mannitol, lactose, leucrose, tris(hydroxyethyl) isocyanurate, palatinitol, tetramethylolcyclohexanol, tetramethylolcyclopentanol, tetramethylolcyclopyranol, glycerol, diglycerol, polyglycerol and 1-0-α-D-glycopyranosyl-D-mannitol dihydrate. Preference is given to disaccharide alcohols.

The polyols can be used in an amount of, for example, from 0.01 to 20 parts by weight, preferably from 0.1 to 20 parts by weight, in particular from 0.1 to 10 parts by weight, based on 100 parts by weight of PVC.

Suitable organic phosphites are those of the general formula $P(OR)_3$, where the radicals R are identical or different alkyl, alkenyl, aryl or aralkyl radicals. Preferred organic phosphites are those of the formulae

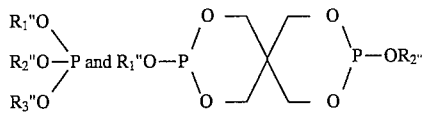

in which $R_1''$, $R_2''$ and $R_3''$ are identical or different and are $C_6$–$C_{18}$alkyl, $C_6$–$C_{18}$alkenyl, substituted or unsubstituted phenyl or $C_5$–$C_7$cycloalkyl.

$C_6$–$C_{18}$alkyl $R_1''$, $R_2''$ and $R_3''$ are, for example, n-hexyl, n-octyl, n-nonyl, decyl, dodecyl, tetradecyl, hexadecyl or octadecyl. Preference is given to alkyl groups having 8 to 18 carbon atoms.

Substituted phenyl $R_1''$, $R_2''$ and $R_3'$ are, for example, tolyl, ethylphenyl, xylyl, cumyl, cymyl, cresyl, 4-methoxyphenyl, 2,4-dimethoxyphenyl, ethoxyphenyl, butoxyphenyl, p-n-octylphenyl, p-n-nonylphenyl or p-n-dodecylphenyl.

Particularly suitable phosphites are trioctyl, tridecyl, tridodecyl, tritetradecyl, tristearyl, trioleyl, triphenyl, tricresyl, tris-p-nonylphenyl and tricyclohexyl phosphites, and particular preference is given to aryl dialkyl phosphites and alkyl diaryl phosphites, for example phenyl didecyl, 2,4-di-tert-butylphenyl didodecyl and 2,6-di-tert-butylphenyl didodecyl phosphites and dialkyl and diaryl pentaerythrityl diphosphites, such as distearyl pentaerythrityl diphosphite, and non-stoichiometric triaryl phosphites, for example of the composition $(H_{19}C_9-C_6H_4)O_{1.5}P(OC_{12,13}H_{25,27})_{1.5}$.

Preferred organic phosphites are distearyl pentaerythrityl diphosphite, trisnonylphenyl phosphite and phenyl didecyl phosphite.

The organic phosphites can be used in an amount of, for example, from 0.01 to 10 parts by weight, preferably from 0.05 to 5 parts by weight, in particular from 0.1 to 3 parts by weight, based on 100 parts by weight of PVC.

Suitable compounds from the series consisting of the hydrotalcites or zeolites are both naturally occurring minerals and synthetic compounds. The additional use of hydrotalcites and/or zeolites in the novel compositions is preferred, since these compounds can synergistically increase the stabilization.

Compounds from the series consisting of the hydrotalcites can be described by the general formula I $$M^{2+}_{1-x}.M^{3+}_x.(OH)_2.(A^{n-})_{x/n}.mH_2O \tag{I}$$

where $M^{2+}$=Mg, Ca, Sr, Zn, Sn, and/or Ni, $M^{3+}$=Al, B or Bi, $A^n$ is an anion having the valency n, n is a number from 1 to 4, x is a number from 0 to 0.5, m is a number from 0 to 2, and $A^n$ is $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $(CHOHCOO)_2^{2-}$, $(CHOH)_4CH_2OHCOO^-$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$ or $HPO_4^{2-}$; further examples are given in DE 41 06 403.

Other hydrotalcites which can preferably be used are compounds having the general formula Ia $$M_x^{2+}Al_2(OH)_{2x+6nz}(A^{n-})_2.mH_2O \tag{Ia}$$

where $M^{2+}$ is at least one metal from the series consisting of Mg and Zn, preferably Mg, $A^{n-}$ is an anion, for example from the series consisting of $CO_3^{2-}$,

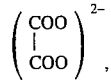

$OH^-$ and $S^{2-}$, where n is the valency of the anion, m is a positive number, preferably from 0.5 to 5, and x and z are positive numbers, x preferably being from 2 to 6 and z preferably being less than 2.

Preference is given to compounds from the series consisting of the hydrotalcites of the general formula I $$M^{2+}_{1-x}.M^{3+}_x.(OH)_2.(A^{n-})_{x/n}.mH_2O \tag{I}$$

where $M^{2+}$ is Mg or a solid solution of Mg and Zn, $A^{n-}$ is $CO_3^{2-}$, x is a number from 0 to 0.5, and m is a number from 0 to 2.

Very particular preference is given to hydrotalcites of the formulae $$Al_2O_3.6MgO.CO_2.12H_2O,$$

$Mg_{4.5}Al_2(OH)_{13}.CO_3.3.5H_2O$, $4MgO.Al_2O_3.CO_2.9H_2O$, $4MgO.Al_2O_3.CO_2.6H_2O$, $ZnO.3MgO.Al_2O_3.CO_2.8-9H_2O$ or $ZnO.3MgO.Al_2O_3.CO_2.5-6H_2O$.

The hydrotalcites can be used in an amount of, for example, from 0.1 to 20 parts by weight, preferably from 0.1 to 10 parts by weight, in particular from 0.1 to 5 parts by weight, based on 100 parts by weight of PVC.

Zeolites can be described by the general formula (X)

$$M_{x/n}[(AlO_2)_x(SiO_2)_y].wH_2O \quad (X)$$

where n is the charge of the cation M,

M is an element from the first or second main group, or zinc, y:x is a number between 0.8 and infinity, preferably between 0.8 and 10.5, and w is a number between 0 and 300.

Furthermore, zeolites which can be used according to the invention are disclosed in "Atlas of Zeolite Structure Types", W. M. Meier and D. H. Olson, Butterworths, 3rd Edition, 1992.

Zeolites in the broader sense also include aluminium phosphates having a zeolite structure.

The preferred zeolites which are known per se have an average effective pore diameter of 3–5 Å and can be prepared by known methods. Particular preference is given to zeolites of type NaA which have an average effective pore diameter of 4 Å, and are therefore known as zeolites 4A.

Particular preference is given to crystalline sodium aluminosilicates whose particle size is at least predominantly in the range from 1–10 μm.

In a preferred embodiment of the invention, sodium aluminosilicates having rounded corners and edges can also be used. These zeolites are advantageously prepared from a batch whose molar composition is in the range 2.5–6.0 $Na_2O.Al_2O_3:0.5-5.0$ $SiO_2.60-200$ $H_2O$. This batch is crystallized in a conventional manner, advantageously by warming at 70°–120° C., preferably 80°–95° C., with stirring for at least ½ hour. The crystalline product is separated off in a simple manner, washed and then dried.

For the purposes of the present invention, finely divided, water-insoluble sodium aluminosilicates which have been precipitated and crystallized in the presence of water-soluble inorganic or organic dispersants can also be used. Suitable water-soluble organic dispersants are surfactants, non-surfactant aromatic sulfonic acids and compounds which are able to complex calcium. Said dispersants can be introduced into the reaction mixture in any desired manner before or during the precipitation; for example, they can be initially introduced as a solution or dissolved in the aluminate and/or silicate solution. The amount of dispersant should be at least 0.05 per cent by weight, preferably from 0.1–5 per cent by weight, based on the total precipitation batch. For the crystallization, the precipitation product is heated at from 50° to 200° C. for from ½ to 24 hours. From the multiplicity of dispersants which can be used, examples which may be mentioned are sodium lauryl ether sulfate, sodium polyacrylate and the sodium salt of 1-hydroxyethane-1,1-diphosphonic acid.

Preference is given to stabilized PVC, as described above, containing at least one of the compounds of the formulae $Na_{12}Al_{12}Si_{12}O_{48}.27$ $H_2O$ [zeolite A], $Na_6Al_6Si_6O_{24}.2NaX.7.5$ $H_2O$, X=OH, halogen, $ClO_4$ [sodalite]

$Na_6Al_6Si_{30}O_{72}.24$ $H_2O$, $Na_8Al_8Si_{40}O_{96}.24$ $H_2O$, $Na_{16}Al_{16}Si_{24}O_{80}.16$ $H_2O$, $Na_{16}Al_{16}Si_{32}O_{96}.16$ $H_2O$, $Na_{56}Al_{56}Si_{136}O_{384}.250$ $H_2O$, [zeolite Y]

$Na_{86}Al_{86}Si_{106}O_{384}.264$ $H_2O$, [zeolite X]

or the zeolites which can be prepared by replacement of all or some of the sodium atoms by lithium, potassium, magnesium, calcium, strontium or zinc atoms, such as $(Na,K)_{10}Al_{10}Si_{22}O_{64}.20$ $H_2O$.

$Ca_{4.5}Na_3[(AlO_2)_{12}(SiO_2)_{12}].30$ $H_2O$ $K_9Na_3[(AlO_2)_{12}(SiO_2)_{12}].27$ $H_2O$.

The zeolites can be used in an amount of, for example, from 0.1 to 20 parts by weight, preferably from 0.1 to 10 parts by weight, in particular from 0.1 to 5 parts by weight, based on 100 parts by weight of PVC.

Dawsonites can likewise be added to the PVC in the same amounts as the zeolites. These are aluminocarbonates of the formula Na(or K or Li)[Al(OH)$_2$CO$_3$].nH$_2$O.

Preference is given to compositions comprising (a) PVC, (b) 0.1–50 parts, per 100 parts of PVC, of a terminal epoxide compound, (c) 0.001–5.0 parts, per 100 parts of PVC, of a perchlorate, and (d) a phenolic antioxidant, in particular 0.01–10.0 parts per 100 parts of PVC.

Preference is furthermore given to PVC stabilized by means of (b), (c) and (d), which additionally comprises substances from the group consisting of metal soaps, plasticizers, fillers and reinforcing materials, other antioxidants, metal soaps and other metal-containing stabilizers, polyols, zeolites, hydrotalcites, dawsonites, organic phosphites, 1,3-diketo compounds, dihydropyridines, sterically hindered amines (HALS), light stabilizers, UV absorbers, lubricants, fatty acid esters, paraffins, blowing agents, optical brighteners, pigments, flameproofing agents, antistatics, β-aminocrotonates, pyrroles, naphthols, hydroxydiphenylamines, phenylindoles, phosphates, thiophosphates, gelling aids, peroxide-destroying compounds, modifiers and other complexing agents for Lewis acids.

Preference is furthermore given to stabilized PVC additionally comprising a 1,3-diketo compound, in particular 0.01–10 parts per 100 parts of PVC.

Preference is given to stabilized PVC additionally comprising a polyol, for example a disaccharide alcohol, in particular 0.01–20 parts per 100 parts of PVC.

Preference is furthermore given to stabilized PVC additionally comprising one or more metal soaps, in particular zinc soaps.

Preference is furthermore given to stabilized PVC additionally comprising at least one additive from the group consisting of disaccharide alcohols, organic phosphites, zeolites, hydrotalcites, dawsonites, aminocrotonates, polyols, diketones, pyrroles, β-naphthol and dihydropyridines.

Preference is furthermore given to stabilized PVC additionally comprising at least one additive from the group consisting of organic phosphites, zeolites, dawsonites and hydrotalcites.

Preference is furthermore given to stabilized PVC additionally comprising a zeolite, in particular 0.1–20 parts per 100 parts of PVC.

Preference is furthermore given to stabilized PVC additionally comprising a hydrotalcite, in particular 0.1–20 parts per 100 parts of PVC.

Preference is furthermore given to stabilized PVC additionally comprising an organic phosphite, in particular 0.01–5 parts per 100 parts of PVC.

Preference is furthermore given to stabilized PVC additionally comprising a dihydropyridine, in particular 0.01–5 parts per 100 parts of PVC.

Preference is furthermore given to stabilized PVC additionally comprising a sterically hindered amine, in particular 0.01–5 parts per 100 parts of PVC.

The present invention furthermore relates to the use of a perchlorate in combination with a terminal epoxide compound and an antioxidant for stabilizing PVC. The above preferences apply to the individual stabilizers and to the PVC itself, and one of the further constituents described above can likewise additionally be used.

The PVC stabilized according to the invention can be prepared in a manner known per se, to which end said stabilizers and, if desired, further additives are mixed with the PVC using equipment known per se, such as calenders, mixers, compounders, extruders and the like. During this operation, the stabilizers can be added individually or as a mixture or alternatively in the form of masterbatches. The invention thus also relates to a process for the preparation of stabilized PVC, which comprises mixing components (b), (c) and (d) of claim 1 and, if desired, further additives with the PVC using equipment such as calenders, mixers, compounders, extruders or the like.

The PVC stabilized in accordance with the present invention can be converted into the desired shape (e.g. foams or moulded articles) in a known manner. Methods of this type are, for example, grinding, calendering, extrusion, injection moulding, sintering or spinning, furthermore extrusion blow moulding or conversion by the plastisol process. The stabilized PVC can also be converted into foams.

The PVC according to the invention is particularly suitable for semirigid and flexible formulations, in particular in the form of flexible formulations for wire sheaths, crash pad films (automobiles) and cable insulations, which is preferred. In the form of semirigid formulations, the novel PVC is particularly suitable for decoration sheeting, foams, agricultural sheeting, tubes, sealing profiles and office films.

In the form of rigid formulations, the PVC stabilized in accordance with the invention is particularly suitable for hollow articles (bottles), packaging films (thermoflammable films), blown films, tubes, foams, heavy profiles (window frames), light-wall profiles, building profiles, sidings, fittings, office films and equipment housings (computers and domestic appliances).

Examples of the use of the PVC according to the invention as plastisols are artificial leather, floor coverings, textile coatings, wall coverings, coil coatings and automobile underseal.

Examples of sintered PVC applications of the PVC stabilized in accordance with the invention are slush, slush mould and coil coatings.

The examples below illustrate the invention in greater detail without representing a limitation. Parts and percentages are, as in the remainder of the description, by weight, unless stated otherwise.

EXAMPLES

A PVC composition is prepared by mixing the individual components as shown in the tables below (amounts in parts by weight).

The constituents are homogenized for 5 minutes in mixing rolls at 170° C. giving a film with a thickness of 0.3–0.5 min.

The long-term stability is determined by a static heat test ("stat.h") in accordance with DIN 53381, in which the sample is stored in a test oven at 190° C. and the time taken for the sample to blacken is determined.

A further determination of the long-term stability ("VDE test") is carded out by determining the thermal stability in accordance with DIN VDE 0472. In this test, the sample is warmed in a glass tube sealed at the bottom (AR glass from Peco-Laborbedarf GmbH, Darmstadt) in an oil bath at 200° C., and the time taken for a visible red coloration (corresponding to a pH of 3) to appear on the universal indicator paper is determined.

A further determination of the stability of the PVC is carded out by the dehydrochlorination test ("DHC test"), carried out in accordance with DIN 53381, sheet 3. In this test, the time taken for the dehydrochlorination curve to rise is measured at the temperature shown in each case.

Long-term oven storage test: Pressed PVC sheets measuring 10×10×2 mm are produced and then stored in an oven at from 100°±0.5° C. for a defined time (3, 7 or 14 days). The samples are then subjected to the dehydrochlorination test described above. The yellowness index (YI) may also be determined.

Long-term milling test. The PVC mixture is milled at a temperature of 180° C. in a mill with a nip width of 0.5 mm, and a sample is taken every 5 minutes and cooled, and its yellowness index (YI) is measured.

TABLE I

| | Dehydrochlorination test at 200° C. | | | | | |
|---|---|---|---|---|---|---|
| Mixture | 1 | 2 | 3 | 4 | 5 | 6 |
| PVC, K value 70 | 100 | 100 | 100 | 100 | 100 | 100 |
| LOXIOL G16[1] | 0.6 | 0.6 | 0.6 | 0.6 | 0.6 | 0.6 |
| Wax E[2] | 0.2 | 0.2 | 0.2 | 0.2 | 0.2 | 0.2 |
| NaClO$_4$ | 0.05 | 0.05 | 0.05 | 0.05 | 0.05 | 0.05 |
| IRGANOX 1010[3] | 0.5 | 0.5 | 0.5 | | | |
| IRGANOX 1076[4] | | | | 0.5 | 0.5 | 0.5 |
| epoxidized soybean oil | 3.0 | | | 3.0 | | |
| Araldit GY 250[5] | | 3.0 | | | 3.0 | |
| Araldit GY 285[6] | | | 3.0 | | | 3.0 |
| Minutes | 26 | 49 | 48 | 26 | 49 | 50 |

[1]Glycerol partial ester,
[2]Ester wax,
[3]Pentaerythrityl tetrakis[3-(3,5-di-tert-butyl-4-hydroxyphenyl)propionate],
[4]Octadecyl 3-(3,5-di-tert-butyl-4-hydroxyphenyl)propionate,
[5]Bisphenol A diglycidyl ether (Araldit ® GY 250),
[6]Bisphenol F diglycidyl ether (Araldit ® GY 285)

It can be seen that the novel stabilization by means of epoxide, perchlorate and antioxidant (mixtures 2, 3, 5 and 6) is far superior to that by means of epoxidized soybean oil, perchlorate and antioxidant (mixtures 1 and 4).

TABLE II

| | Long-term milling test/dynamic heat test | | | |
|---|---|---|---|---|
| Mixture | 7 | 8 | 9 | 10 |
| PVC, K value 70 | 100 | 100 | 100 | 100 |

TABLE II-continued

Long-term milling test/dynamic heat test

| Mixture | 7 | 8 | 9 | 10 |
|---|---|---|---|---|
| LOXIOL G16[1] | 0.6 | 0.6 | 0.6 | 0.6 |
| Wax E[2] | 0.2 | 0.2 | 0.2 | 0.2 |
| IRGAMOD F131[7] | 1.5 | 1.5 | 1.5 | 1.5 |
| Zinc stearate | 0.05 | 0.05 | 0.05 | 0.05 |
| Rhodiastab 50[8] | 0.2 | 0.2 | 0.2 | 0.2 |
| NaClO$_4$ | 0.05 | 0.05 | 0.05 | 0.05 |
| Bisphenol A epoxidized soybean oil | 3.0 |  | 3.0 | 0.5 |
| Araldit PT 810[15] |  | 3.0 |  | 3.0 |
| Minutes | 7 | 30 | 7 | 50 |

[1] Glycerol partial ester,
[2] Ester wax,
[7] Acrylate polymer as processing aid,
[8] Stearoylbenzoylmethane,
[15] solid heterocyclic epoxy resin (triglycidyl isocyanurate)

It can be seen that the use of an antioxidant in novel mixture 10 increases the stabilization effect. The mixtures containing antioxidants and epoxides are superior.

TABLE III

Static heat test

| Mixture | 9 | 10 | 11 |
|---|---|---|---|
| PVC, K value 70 | 100 | 100 | 100 |
| LOXIOL G16[1] | 0.6 | 0,6 | 0,6 |
| Wax[2] E | 0.2 | 0.2 | 0.2 |
| IRGAMOD F131[7] | 1.5 | 1.5 | 1.5 |
| Zinc stearate | 0.05 | 0.05 | 0.05 |
| Rhodiastab 50[8] | 0.2 | 0.2 | 0.2 |
| NaClO$_4$ | 0.05 | 0.05 | 0.05 |
| Bisphenol A epoxidized soybean oil | 0.5 | 0.5 | 0.5 |
| Araldit GY 250[5] | 3.0 |  | 3.0 |
| Araldit PT 810[15] |  | 3.0 |  |
| Minutes | 16 | 122 | 85 |

[1] Glycerol partial ester,
[2] Ester wax,
[5] Bisphenol A diglycidyl ether (Araldit ® GY 250),
[7] Acrylate polymer as processing aid,
[8] Stearoylbenzoylmethane,
[15] solid heterocyclic epoxy resin (triglycidyl isocyanurate)

The advantage of the novel epoxide-containing compositions 10 and 11 over epoxidized soybean oil is also evident in the static heat test.

TABLE IV

VDE test at 200° C.

| Mixture | 12 | 13 | 14 | 15 |
|---|---|---|---|---|
| PVC, K value 70 | 100 | 100 | 100 | 100 |
| DIDP[13] plasticizer | 49 | 49 | 49 | 49 |
| Chalk | 50 | 50 | 50 | 50 |
| NaClO$_4$ | 0.05 | 0.05 | 0.05 | 0.05 |
| Araldit GY 282[3] | 5 | 5 | 5 | 5 |
| Zinc stearate | 0.6 | 0.6 | 0.6 | 0.6 |
| Maltitol | 0.5 | 0.5 | 0.5 | 0.5 |
| Bisphenol A | 0.5 | 0.5 | 0.5 | 0.5 |
| β-Diketone[14] | 0.3 | 0.3 | 0.3 | 0.3 |
| Wessalith P[10] | 100 |  |  |  |
| m-OH-DPA[9] |  | 0.3 |  |  |
| Pyrrole |  |  | 0.3 |  |
| β-Naphthol |  |  |  | 0.3 |
| Minutes | 202 | 206 | 200 | 205 |

TABLE IV-continued

VDE test at 200° C.

| Mixture | 12 | 13 | 14 | 15 |
|---|---|---|---|---|

[3] Bisphenol F diglycidyl ether (Araldit ® GY 282),
[9] m-Hydroxydiphenylamine,
[10] 4A-Zeolite from Degussa,
[13] Diisododecyl phthalate,
[14] Stearoylbenzoylmethane, dibenzoylmethane A further increase in stability can be achieved by using additional substances.

TABLE V

Dehydrochlorination test at 200° C.

| Mixture | 16 | 17 | 18 |
|---|---|---|---|
| PVC, K value 70 | 100 | 100 | 100 |
| DIDP[1] plasticizer | 50 | 50 | 50 |
| NaClO$_4$ | 0.05 | 0.05 | 0.05 |
| Araldit GY 250[5] | 3 | 3 | 3 |
| Bisphenol A | 0.5 |  |  |
| Irganox 1076[4] |  | 0.5 |  |
| Irganox 1010[3] |  |  | 0.5 |
| Minutes | 43 | 51 | 52 |

[1] Diisododecyl phthalate,
[3] Pentaerythrityl tetrakis[3-(3,5-di-tert-butyl-4-hydroxyphenyl)propionate],
[4] Octadecyl 3-(3,5-di-tert-butyl-4-hydroxyphenyl)propionate,
[5] Bisphenol A diglycidyl ether (Araldit ® GY 250)

The use in flexible PVC compositions is shown here.

TABLE VI

Yellowness Index of pressed sheets

| Mixture | 19 | 20 | 21 | 22 |
|---|---|---|---|---|
| PVC, K value 70 | 100 | 100 | 100 | 100 |
| LOXIOL G16[1] | 1 | 1 | 1 | 1 |
| Wax E[2] | 0.2 | 0.2 | 0.2 | 0.2 |
| IRGAMOD F131[7] | 1.5 | 1.5 | 1.5 | 1.5 |
| Zinc stearate | 0.05 | 0.05 | 0.05 | 0.05 |
| Rhodiastab 50[8] | 0.2 | 0.2 | 0.2 | 0.2 |
| NaClO$_4$ | 0.05 | 0.05 | 0.05 | 0.05 |
| Bisphenol A epoxidized soybean oil |  |  | 0.5 | 0.5 |
| soybean oil | 3.0 |  | 3.0 |  |
| Araldit GY 250[5] | 3.0 |  |  | 3.0 |
| YI | 79 | 24 | 82 | 21 |

[1] Glycerol partial ester,
[2] Ester wax,
[5] Bisphenol A diglycidyl ether (Araldit ® GY 250),
[7] Acrylate polymer as processing aid,
[8] Stearoylbenzoylmethane,
[15] solid heterocyclic epoxy resin (triglycidyl isocyanurate)

Novel mixtures 20 and 22 have yellowed significantly less than the comparative mixtures containing epoxidized soybean oil.

TABLE VII

Static heat test at 190° C.

| Mixture | 23 | 24 | 25 |
|---|---|---|---|
| PVC, K value 60 | 100 | 100 | 100 |
| PMMA[16] | 1 | 1 | 1 |
| PMMA/acrylate[17] | 0.5 | 0.5 | 0.5 |
| Wax E[18] | 0.5 | 0.5 | 0.5 |
| Loxiol G13[19] | 0.5 | 0.5 | 0.5 |
| Loxiol G40[20] | 0.4 | 0.4 | 0.4 |

TABLE VII-continued

| | Static heat test at 190° C. | | |
|---|---|---|---|
| Mixture | 23 | 24 | 25 |
| Reoplast 39[21] | 0.5 | 0.5 | 0.5 |
| Irgastab T634[22] | 2.5 | | |
| NaClO$_4$ | | 0.05 | 0.05 |
| Zinc stearate | | 0.05 | 0.05 |
| Araldit GY 250[2] | | 3 | 3 |
| β-Diketone[4] | | 0.2 | 0.2 |
| Bisphenol A | | 0.5 | |
| Irganox 1010[8] | | | 0.5 |
| Minutes | 60 | 67 | 83 |

[4]Stearoylbenzoylmethane, dibenzoylmethane,
[8]Pentaerythrityl tetrakis[3-(3,5-di-tert-butyl-4-hydroxyphenyl)propionate],
[16]Polymethyl methacrylate processing aid,
[17]Polymethyl methacrylate/acrylate processing aid,
[18]Ester wax,
[19]Lubricant,
[20]Lubricant,
[21]Epoxidized soybean oil,
[22]Tin stabilizer The superior stabilizer action with perchlorate, epoxide and antioxidant (mixture 25) is apparent.

TABLE VIII

| | Static heat test at 190° C. | | | |
|---|---|---|---|---|
| Mixture | 26 | 27 | 28 | 29 |
| PVC, K value 82 | 100 | 100 | 100 | 100 |
| Chalk | 6 | 6 | 6 | 6 |
| Kronos 2220[23] | 4 | 4 | 4 | 4 |
| Irgastab CH 302[24] | 0.4 | 0.4 | 0.4 | 0.4 |
| IRGAMOD F131[7] | 1 | 1 | 1 | 1 |
| IRGAWAX 351[25] | 0.5 | 0.5 | 0.5 | 0.5 |
| Lubricant | 0.5 | 0.5 | 0.5 | 0.5 |
| CZ 2000[26] | 3 | | | |
| NaClO$_4$ | | 0.05 | 0.05 | 0.05 |
| Zinc stearate | | 0.5 | 0.5 | 0.5 |
| Araldit GY 250[5] | | 3 | 3 | 3 |
| β-Diketone[4] | | 0.2 | 0.2 | 0.2 |
| Bisphenol A | | 0.5 | | |
| Irganox 1010[8] | | | 0.5 | 0.5 |
| Polyol (THEIC)[27] | | | | 0.3 |
| Minutes | 52 | 56 | 62 | 65 |

[4]Stearoylbenzoylmethane, dibenzoylmethane,
[5]Bisphenol A diglycidyl ether (Araldit ® GY 250),
[7]Acrylate polymer as processing aid,
[8]Pentaerythrityl tetrakis[3-(3,5-di-tert-butyl-4-hydroxyphenyl)propionate],
[23]Titanium dioxide,
[24]Phosphite stabilizer,
[25]Paraffin wax,
[26]Calcium/zinc stabilizer,
[27]Trishydroxyethyl isocyanurate The superior stabilizer action with perchlorate, epoxide and antioxidant is apparent. The addition of polyol has a particularly favourable effect.

TABLE IX

| | Static heat test at 190° C. | | | |
|---|---|---|---|---|
| Mixture | 30 | 31 | 32 | 33 |
| PVC, K value 82 | 100 | 100 | 100 | 100 |
| Chalk | 6 | 6 | 6 | 6 |
| Kronos 2220[23] | 4 | 4 | 4 | 4 |
| Irgastab CH 302[24] | 0.4 | 0.4 | 0.4 | 0.4 |
| IRGAMOD F131[7] | 1 | 1 | 1 | 1 |
| IRGAWAX 351[25] | 0.5 | 0.5 | 0.5 | 0.5 |
| Lubricant | 0.5 | 0.5 | 0.5 | 0.5 |
| NaClO$_4$ | 0.05 | 0.05 | 0.05 | 0.05 |
| Zinc stearate | 0.2 | 0.2 | 0.2 | 0.2 |
| Araldit PT 810[15] | 1 | 1 | 1 | 1 |
| Irgastab A 70[28] | 1 | 1 | 1 | 1 |
| Bisphenol A | | 0.5 | | |
| Irganox 1010[8] | | | 0.5 | 0.5 |
| Poylol (THEIC)[27] | | | | 0.3 |
| Minutes | 48 | 50 | 55 | 58 |

[4]Stearoylbenzoylmethane, dibenzoylmethane,
[5]Bisphenol A diglycidyl ether (Araldit ® GY 250),
[7]Acrylate polymer as processing aid,
[8]Pentaerythrityl tetrakis[3-(3,5-di-tert-butyl-4-hydroxyphenyl)propionate],
[15]solid heterocyclic epoxy resin (triglycidyl isocyanurate),
[23]Titanium dioxide,
[24]Phosphite stabilizer,
[25]Paraffin wax,
[27]Trishydroxyethyl isocyanurate,
[28]Aminocrotonate It can be seen that perchlorate, epoxide, antioxidant and polyol together give particularly good stabilization.

What is claimed is:

1. A composition comprising
   (a) polyvinyl chloride;
   (b) 0.001–5.0 parts, per 100 parts of polyvinyl chloride, of perchloric acid or a perchlorate of the formula $M(Cl)_4)_n$ where $M^+$ is $H^+$, $NH_4^+$, $Na^+$, $K^+$, $Mg^{2+}$, $Ca^{2+}$, $Ba^{2+}$ or $Al^{3+}$ and n is 1, 2 or 3, corresponding to the valency of M;
   (c) 0.1–50 parts, per 100 parts of PVC, of a terminal epoxide compound containing an epoxide radical of the formula I

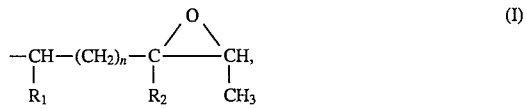

where $R_1$ and $R_3$ are both hydrogen, $R_2$ is hydrogen or methyl, and n is 0, or in which $R_1$ and $R_3$ together are $-CH_2-CH_2-$ or $-CH_2CH_2-CH_2-$, $R_2$ is then hydrogen, and n is 0 or 1 and this epoxide radical is bonded directly to carbon, oxygen, nitrogen or sulfur atoms; and
   (d) 0.01–10.0 parts, per 100 parts of polyvinyl chloride, of an antioxidant.

2. A composition according to claim 1, wherein component (c) is a diglycidyl ether based on 2,2-bis(4-hydroxyphenyl)propane, bis(4-hydroxyphenyl)methane or mixtures of bis(ortho/para-hydroxyphenyl)methane.

3. A method for stabilizing polyvinyl chloride which comprises incorporating into said polyvinyl chloride the components (b), (c) and (d) as defined in claim 1.

4. A composition according to claim 1, wherein the composition is in the form of a molded article.

5. A composition according to claim 4, wherein the molded article is selected from the group consisting of a wire sheath, cable insulation, decoration sheeting, foam, agricultural sheeting, tube, sealing profile, office film, hollow article, packaging film, blown film, crash pad film, tube, heavy profile, light-wall profile, building profile, siding, fitting or equipment housing.

6. A composition according to claim 1, wherein component (b) is an alkali metal perchlorate.

7. A composition according to claim 1, wherein component (d) is a phenolic antioxidant.

8. A composition according to claim 1, additionally comprising substances selected from the group consisting of metal soaps, plasticizers, fillers and reinforcing materials, other antioxidants, polyols, zeolites, hydrotalcites, dawsonites, organic phosphites, 1,3-diketo compounds, dihydropyridines, sterically hindered amines (HALS), light stabilizers, UV absorbers, lubricants, fatty acid esters, paraffins, lubricants, optical brighteners, pigments, flameproofing agents, antistatics, β-aminocrotonates, pyrroles, β-naphthols, hydroxydiphenylamines, phenylindoles, phosphates, thiophosphates, gelling aids, peroxide-destroying compounds, modifiers and other complexing agents for Lewis acids.

9. A composition according to claim 1, additionally comprising a filler.

10. A composition according to claim 1, additionally comprising one or more metal soaps.

11. A composition according to claim 1, additionally comprising at least one additive selected from the group consisting of disaccharide alcohols, metal-free stabilizers, phosphites, zeolites, hydrotalcites, aminocrotonates, polyols, dawsonites, diketones and dihydropyridines.

12. A composition according to claim 1, additionally comprising at least one additive selected from the group consisting of organic phosphites, zeolites, dawsonites and hydrotalcites.

* * * * *